United States Patent
Kosaka et al.

[11] Patent Number: 6,157,779
[45] Date of Patent: Dec. 5, 2000

[54] IMAGE SHAKE CORRECTING OPTICAL APPARATUS

[75] Inventors: Akira Kosaka, Yao; Junichi Tanii, Izumi; Yoshihiro Hara, Kishiwada; Yoshiharu Tanaka, Kawachinagano; Shoichi Minato, Sakai, all of Japan

[73] Assignee: Minolta Co., Ltd., Osaka, Japan

[21] Appl. No.: 09/320,870

[22] Filed: May 27, 1999

[30]  Foreign Application Priority Data

May 28, 1998 [JP] Japan ................................. 10-162824

[51] Int. Cl.[7] ............................ G03B 17/00; G02B 27/64
[52] U.S. Cl. ............................................. 396/55; 359/557
[58] Field of Search ....................... 396/55, 89; 348/208; 359/554–557

[56]  References Cited

U.S. PATENT DOCUMENTS 4,860,040  8/1989  Tamamura et al. ....................... 396/89

FOREIGN PATENT DOCUMENTS 6-018954  1/1994  Japan .

*Primary Examiner*—W. B. Perkey
*Attorney, Agent, or Firm*—Morrison & Foerster, LLP

[57]  ABSTRACT

To provide an image shake correcting optical apparatus using a small, lightweight engaging mechanism for the correction lens holder engaging mechanism. A ring-shaped engaging member 16 formed of shape memory alloy and having three engaging arms on its inside is located outside a lens holder 11 for a correction lens L3, and the engaging contacts 16b at the tips of the engaging arms 16a are pushed toward the center of the ring-shaped engaging member by means of coil springs 17. The engaging member 16 formed of shape memory alloy has a prescribed memorized shape so that the arms 16a will assume a retracted position, and where no heat is applied, the engaging contacts 16b of the engaging arms press onto the lens holder 11 for the correction lens L3 from the outside due to the spring force of the coil springs 17, and engages with and maintains in place the lens holder 11. Where heat is applied, the engaging arms 16a retract, whereupon the engagement of the lens holder 11 is terminated.

16 Claims, 10 Drawing Sheets

IMAGE SHAKE CORRECTING OPTICAL APPARATUS

This application is based on application No. 10-162824 filed in Japan, the content of which is hereby incorporated by reference.

BACKGROUND OF THE INVENTION

1. Field of the Invention

The present invention pertains to an image shake correcting optical apparatus, and more particularly to an image shake correcting optical apparatus that can maintain at a prescribed position a correction optical system that can correct image shake that occurs due to movement of the optical apparatus.

2. Description of the Related Art

Conventionally, in the camera field, as a means to correct image shake in the focal plane due to the shaking of the camera user's hands when a photograph is being taken, a correction optical system is known in which a correction lens is located behind the photo-taking lens and is driven within a plane perpendicular to the optical axis of the camera to decenter the correction optical system. A lens apparatus equipped with this correction optical system has a construction in which a dedicated actuator to drive the correction lens in prescribed directions is incorporated in the lens apparatus, the amount of camera shake is detected by a shake sensor such as an angular velocity sensor, and the correction lens is driven by means of the detection signals from this sensor.

As the actuator that drives the correction optical system, a moving coil actuator has been proposed in which two electromagnetic coils are located in a plane perpendicular to the camera's optical axis, and yokes and permanent magnets are located on the fixed frame of the lens barrel so as to correspond to the electromagnetic coils.

Because this moving coil actuator is easy to control, it is appropriate for a drive mechanism for the correction lens that corrects image shake, but if the supply of current to the electromagnetic coils is cut off, the correction lens cannot be maintained at that position. As a result, in order to maintain and fix the correction lens at a prescribed position, a separate fixing mechanism by means of an electromagnetic means has been used, including the driving of the plunger using a solenoid.

However, because such a fixing mechanism based on an electromagnetic means is large and heavy, it makes the optical apparatus large as a whole and increases its cost.

Where the fixing mechanism is based on an electromagnetic means, disengagement of the correction lens fixed at a prescribed position takes place instantaneously, and therefore, when disengagement occurs, the correction lens may move inadvertently, and the camera user may experience a sense of unease during the movement of the screen.

SUMMARY OF THE INVENTION

An object of the present invention is to resolve the problems described above, and to provide a low-cost image shake correcting optical apparatus that does not increase the size of the entire optical apparatus. Another object is to provide an image shake correcting optical apparatus that does not cause a sense of unease in the user.

In order to attain these objects, an image shake correcting optical apparatus of the present invention has a correction optical system that is supported such that an optical axis of the correction optical system is moved relative to another optical system to decenter the correction optical system; a drive mechanism that drives the correction optical system; and an engaging mechanism that has an action member of shape memory alloy and that has an engaging state in which the correction optical system is maintained at a position and a non-engaging state in which the correction optical system is not maintained at the position.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Embodiments of the present invention are explained below.

First Embodiment

FIGS. 1 through 6 are drawings to explain the image shake correcting optical apparatus of the first embodiment.

Figure 1:
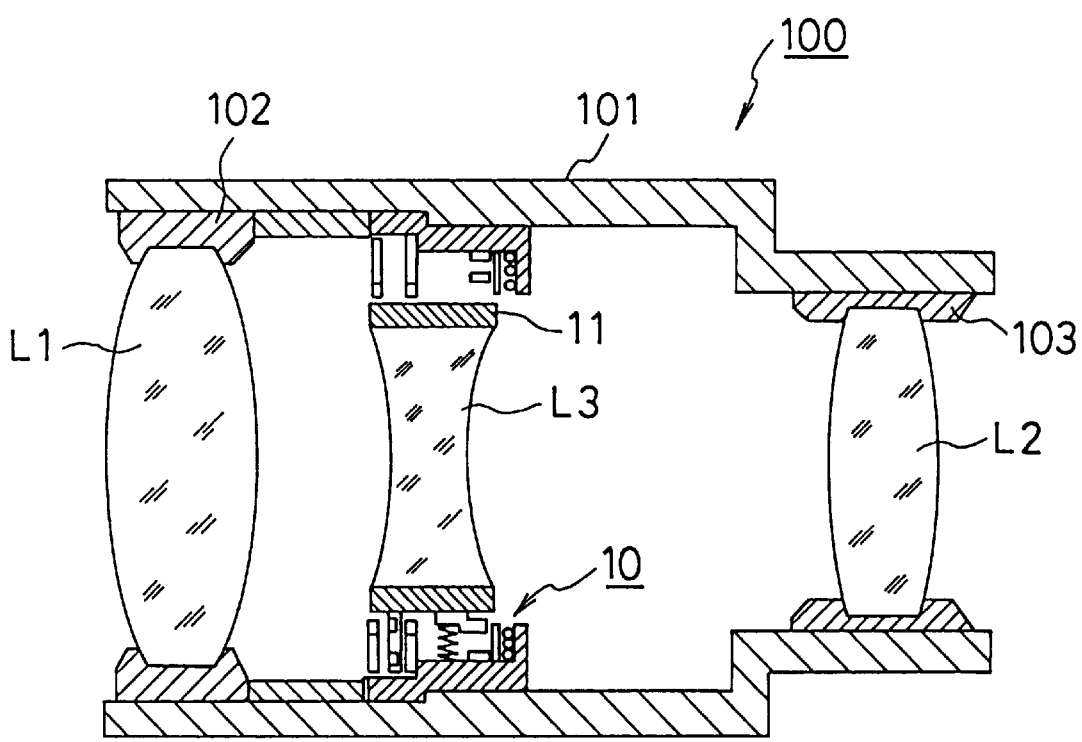
FIG. 1 is a cross-sectional view of the lens apparatus incorporating the image shake correcting optical apparatus.
Figure 2:
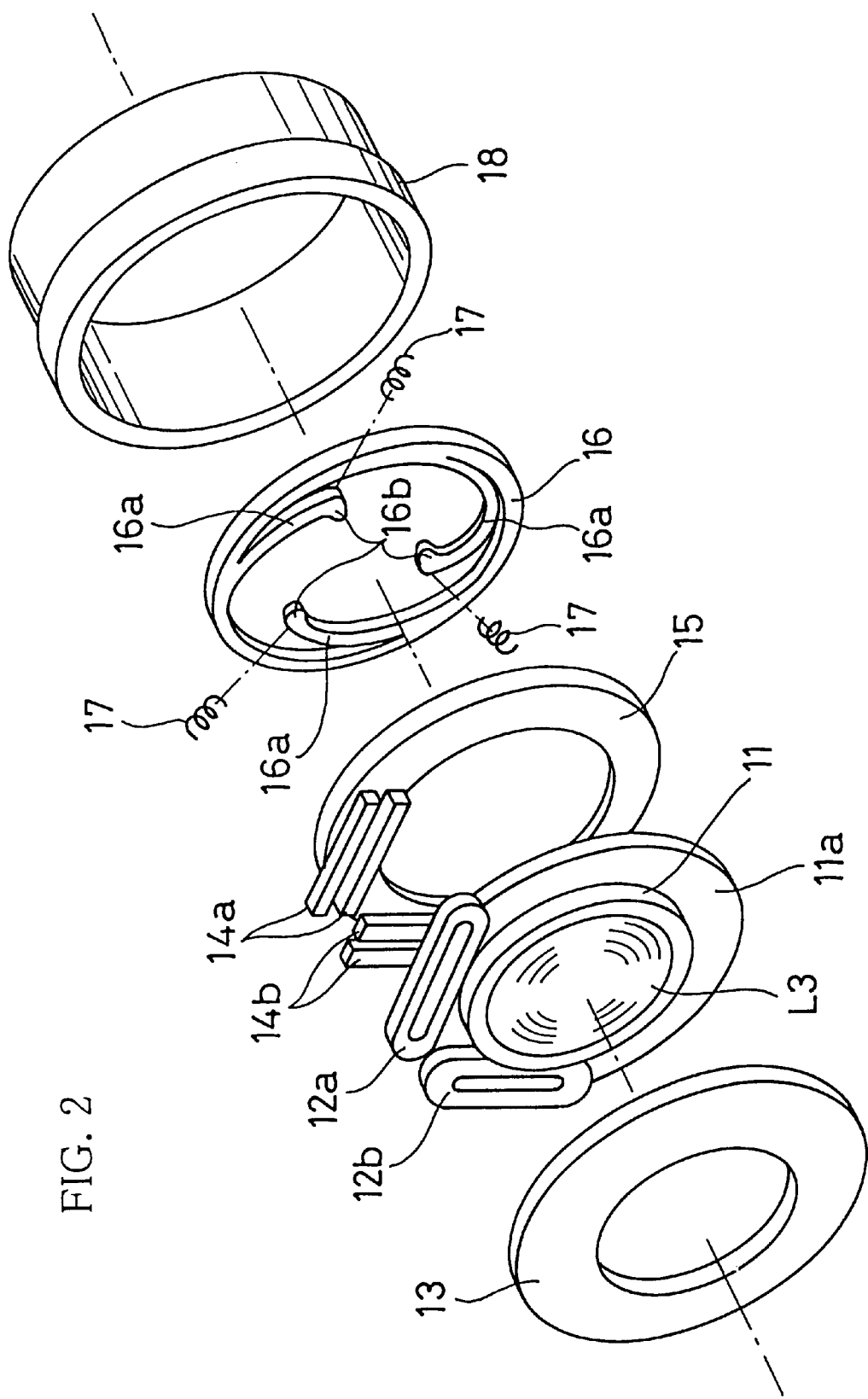
FIG. 2 is an exploded perspective view of the component elements of the correction lens drive mechanism and the correction lens engaging mechanism of the first embodiment.
Figure 3:
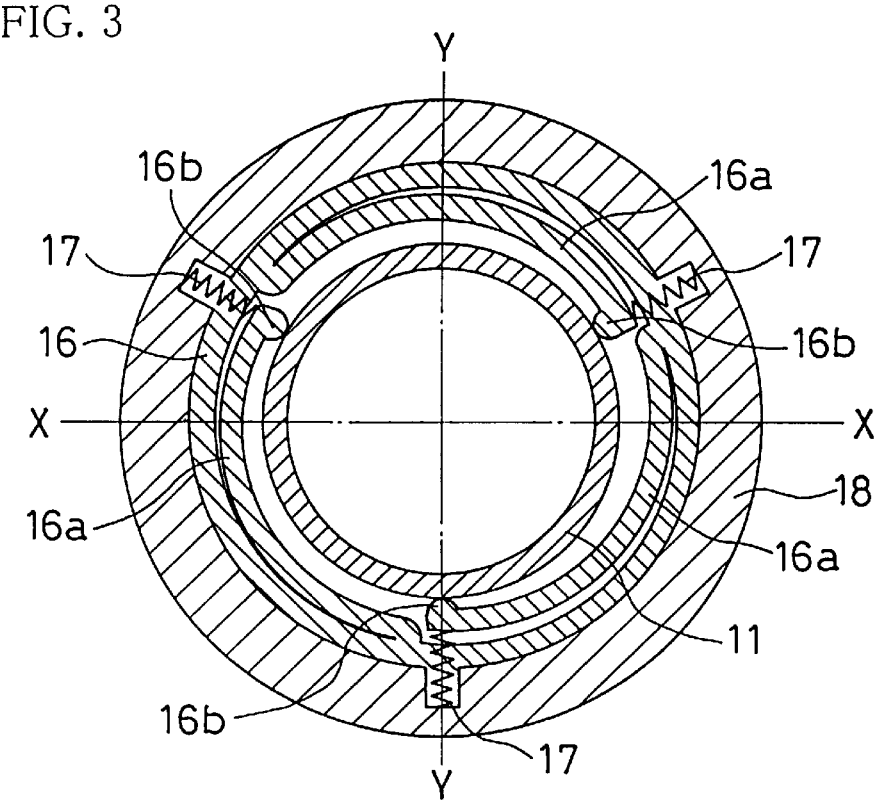
FIG. 3 is a cross-sectional view of the correction lens engaging mechanism of the first embodiment seen from the front.
Figure 4:
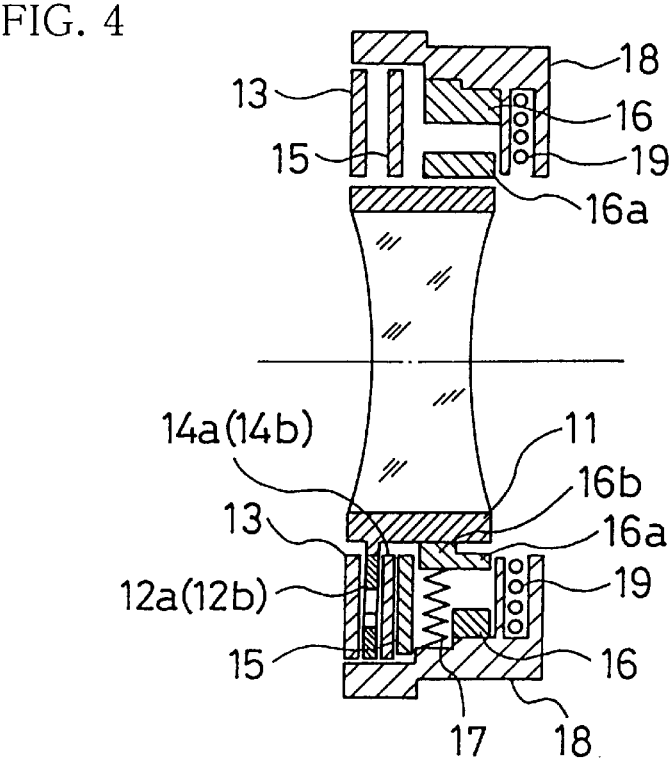
FIG. 4 is a cross-sectional view cut along the Y—Y line of FIG. 3.
Figure 5:
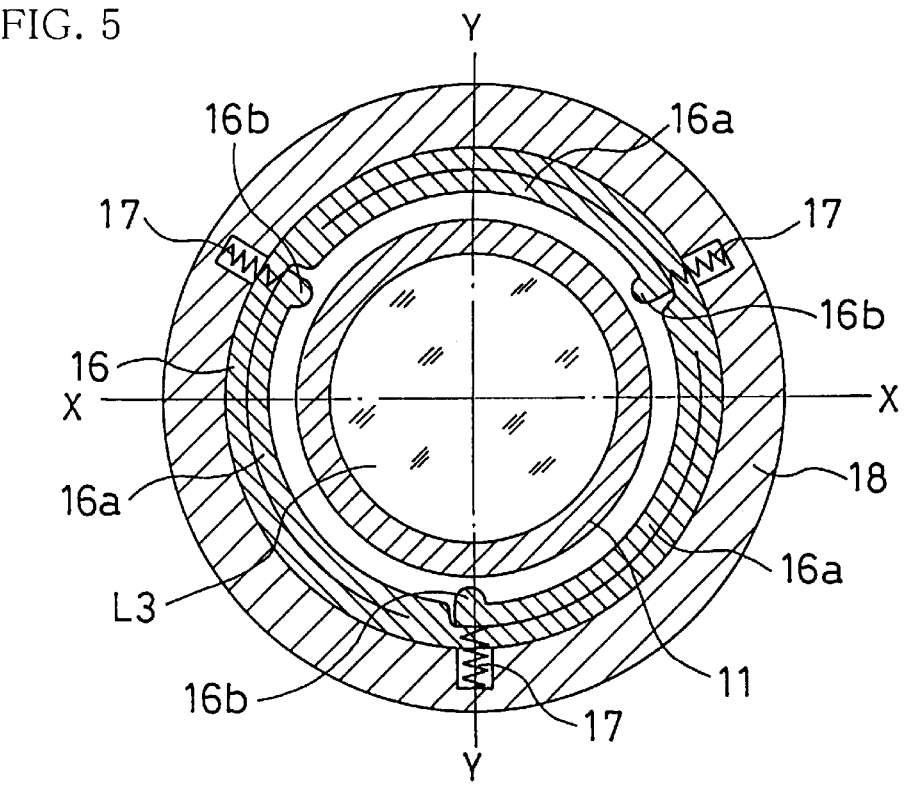
FIG. 5 is a cross-sectional view of the correction lens engaging mechanism of the first embodiment seen from the front.
Figure 6:
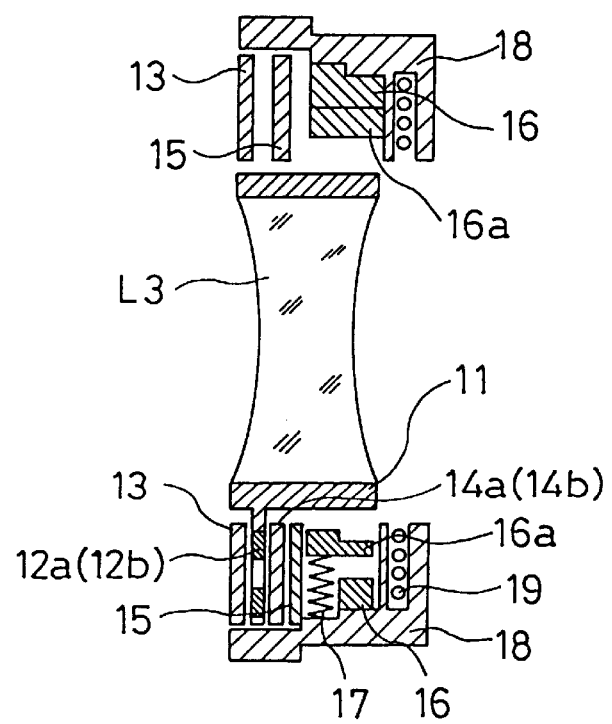
FIG. 6 is a cross-sectional view cut along the Y—Y line of FIG. 5.

FIG. 1 is a cross-sectional view of the lens apparatus incorporating the image shake correcting optical apparatus, FIG. 2 is an exploded perspective view of the component elements of the correction lens drive mechanism, FIG. 3 is a cross-sectional view of the correction lens engaging mechanism seen from the front, and FIG. 4 is a cross-sectional view cut along the Y—Y line of FIG. 3. FIG. 5 is a cross-sectional view of the correction lens engaging mechanism seen from the front when engagement has been terminated, and FIG. 6 is a cross-sectional view cut along the Y—Y line of FIG. 5.

FIG. 1 shows an example of a camera photo-taking lens apparatus incorporating the image shake correcting optical apparatus. In the drawing, the lens apparatus 100 comprises a lens barrel 101, a first lens L1 supported by a lens holder 102 at the leftmost end of the lens barrel 101, i.e., the photo object side, a second lens L2 supported by a lens holder 103 at the rightmost end of the lens barrel 101, i.e., at the camera side, and a correction lens L3 supported between the first and second lenses by a lens holder 11. The lens holder 11 for the correction lens L3 is constructed so as to be freely moved in a plane perpendicular to the optical axis of the camera by means of a correction lens drive mechanism 10 explained below.

When the camera to which the photo-taking lens apparatus is mounted is caused to vibrate due to hand shake, the direction and amount of the vibration are detected by a hand shake sensor (here, an angular velocity sensor may be used, for example), the correction lens drive mechanism 10 is operated based on the results of this detection, and the correction lens L3 mounted to the lens holder 11 is moved in the appropriate direction for correcting the image shake in the focal plane. Consequently, even where the camera moves due to the shake of the hands, the occurrence of image shake on the focal plane may be corrected.

The correction lens drive mechanism 10 will now be explained. This drive mechanism uses the moving coil (hereinafter simply 'coil') method.

In FIGS. 2 through 6, a coil 12a located parallel to the X axis, which runs perpendicular to the optical axis of the photo-taking lens, and a coil 12b located parallel to the Y axis, which runs perpendicular to the optical axis of the photo-taking lens and the X axis, are mounted on the flange 11a of the lens holder 11 for the correction lens L3. When seen along the optical axis, a yoke 13 fixed to the fixed frame 18 is located in front of the coils 12a and 12b, and a yoke 15 fixed to the fixed frame 18 is located behind the coils 12a and 12b. Permanent magnets 14a and permanent magnets 14b are mounted to the yoke 15 such that the permanent magnets 14a face the coil 12a located parallel to the X axis and the permanent magnets 14b face the coil 12b located parallel to the Y axis.

Due to the construction described above, when current is supplied to the coil 12a, the lens holder 11 for the correction lens L3 can be moved along the Y axis as a result of the force that is generated in the coil and works along the Y axis, while when current is supplied to the coil 12b, the lens holder 11 for the correction lens L3 can be moved along the X axis due to the force that is generated in the coil and works along the X axis. The correction lens L3, by combining these structure, is moved to a desired position perpendicular to the optical axis.

The correction lens engaging mechanism will now be explained. A ring-shaped engaging member 16 formed of shape memory alloy is located behind the yoke 15, as seen along the optical axis, and around the lens holder 11 for the correction lens L3. Three engaging arms 16a are formed in the inner side of the engaging member 16 and engaging contacts 16b are formed at the tips of the engaging arms 16a.

The engaging member 16 is inserted in the ring-shaped fixed frame 18 inside the lens barrel such that the engaging member 16 is in contact with the fixed frame 18 throughout its outer surface. Coil springs 17 are attached to the fixed frame 18 at positions at which they will correspond to the engaging contacts 16b at the tips of the engaging arms 16a, such that the coil springs 17 push the engaging contacts 16b toward the center of the ring-shaped engaging member 16. The coil springs 17 may comprise plate springs or other types of elastic members instead of coil springs.

Further, a heater 19 comprising nichrome wire is located dose to the engaging member 16 inserted inside the ring-shaped fixed frame 18, such that when power is supplied to the heater 19 from a power source not shown in the drawings, the heater 19 generates heat and heats the engaging member 16 formed of shape memory alloy.

The engaging member 16 formed of shape memory alloy has the property of returning to an original shape of the engaging member 16 when the engaging member 16 is heated to a prescribed temperature. In the present embodiment, a prescribed shape is memorized in advance so that the engaging arms 16a retracts. At room temperature, i.e., when no heat is supplied, the engaging contacts 16b at the tips of the engaging arms 16a are in pressure contact from the outside with the lens holder 11 for the correction lens L3 due to the spring force of the coil springs 17, such that they engage with the lens holder 11 and maintain the lens holder in place.

When the engaging member 16 formed of shape memory alloy is heated to a prescribed temperature by means of the heater 19, the engaging arms 16a return to the memorized shape against the spring force of the coil springs 17, such that the engaging contacts 16b at the tips of the arms come away from the lens holder 11, whereupon the engagement of the lens holder is terminated. Accordingly, the axis of the correction lens is decentered.

Figure 7:
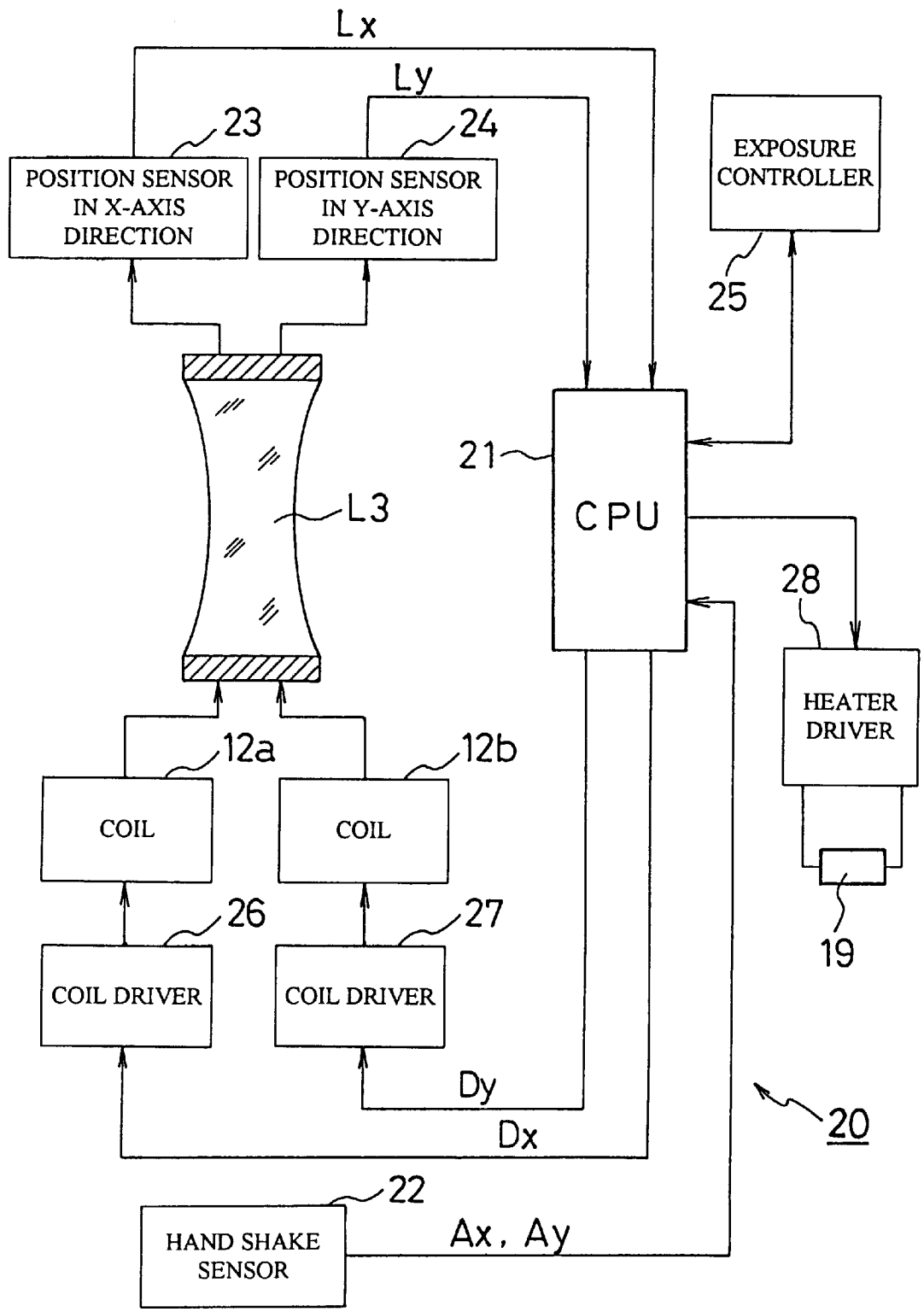
FIG. 7 is a block diagram of the control circuit of the correction lens drive mechanism and the correction lens engaging mechanism.

FIG. 7 is a block diagram showing the construction of the control circuit that drives the correction lens drive mechanism and the correction lens engaging mechanism. The control circuit 20 comprises a CPU 21. Position detecting sensors 23 and 24 that detect positions in the X-axis and Y-axis directions of the correction lens, respectively, are connected to the input port of the CPU 21, and control signals from the camera's exposure control mechanism 25 are also input to the input port. Coil drivers 26 and 27 that respectively drive the coils 12a and 12b and a heating driver 28 that drives the heater 19 are connected to the output port of the CPU 21.

Figure 8:
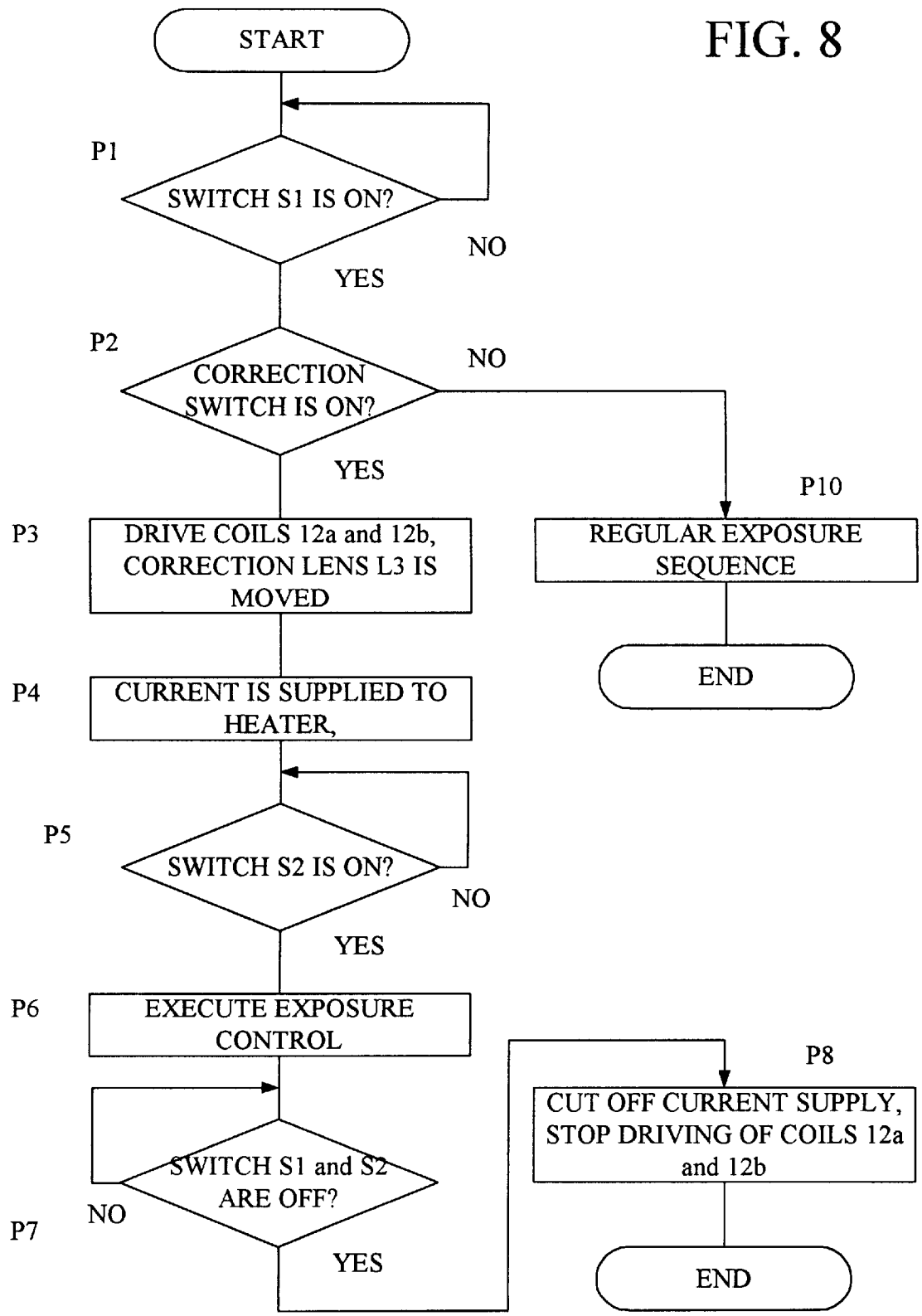
FIG. 8 is a flow chart to explain the control sequence performed by the control circuit.

The correction lens drive mechanism control sequence that is executed by the CPU 21 will now be explained with reference to the flow chart of FIG. 8. First, the CPU 21 waits for the output from the camera's exposure control mechanism 25 of the signal that indicates the turning ON of the switch S1, which represents the beginning of preparations for exposure and which is brought about by the first-stroke pressing (halfway pressing) of the shutter release button (step P1). When the switch S1 ON signal is input, the CPU 21 determines whether or not the hand shake correction switch that selects whether or not to perform hand shake correction is ON (step P2).

If the hand shake correction switch is ON, the image shake correcting operation is begun. In other words, where the X-axis and Y-axis amounts Ax and Ay of the shaking of the camera, i.e., the lens apparatus, are detected by the hand shake sensor 22, the CPU 21 outputs signals Dx and Dy to the coil drivers 26 and 27 to drive the coils 12a and 12b so that the correction lens L3 will be moved in the direction in which the image shake will be corrected (step P3). At the same time, the CPU 21 supplies current to the heater 19 via the heater driver 28 to heat the engaging member 16 formed of shape memory alloy so that the engaging arms will disengage from the lens holder 11 (step P4).

The position Lx in X-axis direction and the position Ly in Y-axis direction of the correction lens are detected by the position detecting sensors 23 and 24 and fed back to the CPU 21, whereupon the operation to move the correction lens L3 to the position at which the image shake is corrected continues.

Now that the image shake correcting operation is begun, the CPU 21 waits for the turning ON of the exposure start switch S2 (step P5). Where the signal that indicates the turning ON of the exposure start switch S2 is input, the CPU 21 executes exposure control (step P6) and waits for the output of OFF signals for the switches S1 and S2 (step P7). When the OFF signals are output, the CPU 21 determines that exposure has been completed, cuts off the supply of current to the heater 19 and stops the driving of the coils 12a and 12b (step P8), whereupon the routine comes to an end.

If the hand shake correction switch is determined not to be ON in step P2, the CPU 21 executes the regular exposure sequence (step P10) and ends the routine.

In the construction described above, the separate heater is used to heat the engaging member formed of shape memory alloy, but it is also acceptable if current is supplied to the engaging member itself so that the engaging member 16 generates heat based on its own resistance and reach the prescribed temperature.

In addition, in the construction described above, the engagement of the correction lens holder is terminated by causing the shape memory alloy to return to its memorized shape based on the heating, but conversely the shape memory alloy may be caused to return to the memorized shape by the heating so that the shape memory alloy engages with the correction lens holder and maintain it in place.

Second Embodiment

The second embodiment will now be explained. Because the second embodiment also uses the moving coil drive mechanism for the correction lens drive mechanism, as in the first embodiment, the mechanism will not be shown using drawings or explained, but the mechanism to engage with and maintain in place the correction lens holder will be explained.

Figure 9:
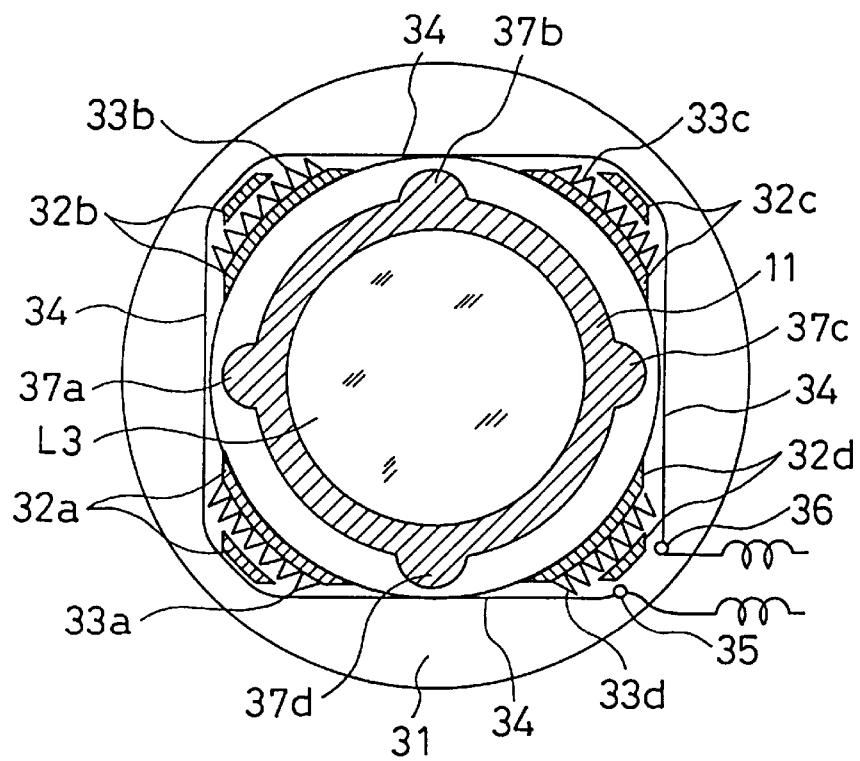
FIG. 9 is a cross-sectional view of the correction lens engaging mechanism of the second embodiment seen from the front.
Figure 10:
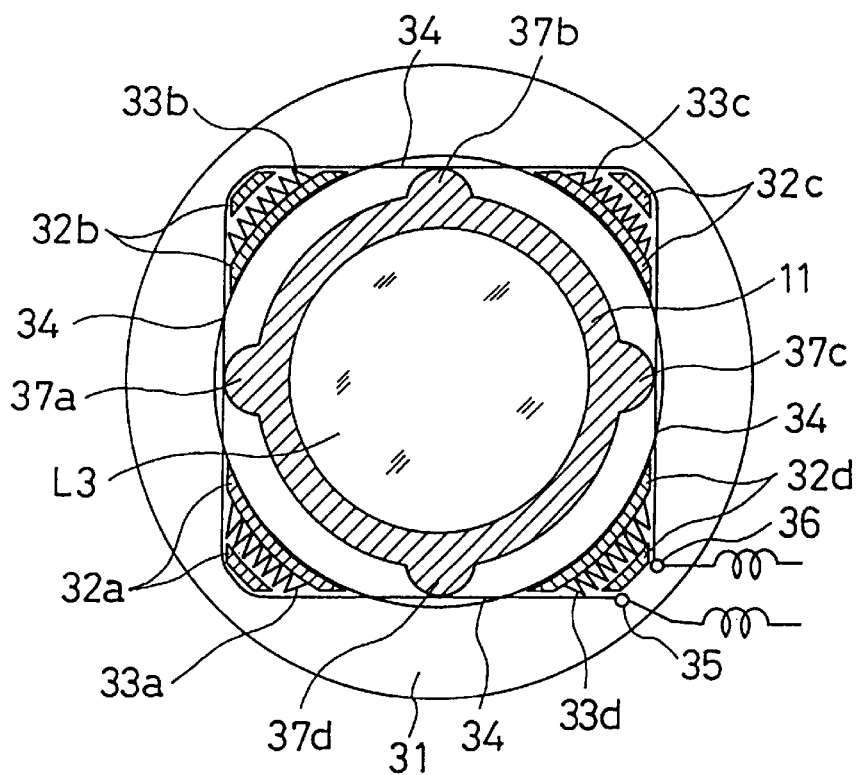
FIG. 10 is a cross-sectional view of the correction lens engaging mechanism of the second embodiment seen from the front.

FIGS. 9 and 10 are front elevations to explain the mechanism to engage with and maintain in place the correction lens holder of the second embodiment. FIG. 9 shows the situation in which the correction lens holder is disengaged and FIG. 10 shows the situation in which the correction lens holder is engaged. The same numbers are used for the same members shown with reference to the first embodiment, and their detailed explanations are omitted.

In FIGS. 9 and 10, spring brackets 32a, 32b, 32c and 32d are located on the ring-shaped fixed frame 31 inside the lens barrel such that they are distanced from one another by 90 degrees, and coil springs 33a, 33b, 33c and 33d are inserted in the spring brackets 32a, 32b, 32c and 32d, respectively. Further, a wire 34 formed of shape memory alloy is located outside the spring brackets 32a, 32b, 32c and 32d as if to wrap the spring brackets from the outside, and the wire 34 and the ends of the coil springs 33a, 33b, 33c and 33d are in contact with each other. The ends of the wire 34 are connected to terminals 35 and 36 located on the fixed frame 31, such that the wire 34 is connected to a power supply not shown in the drawings.

On the other hand, protrusions 37a, 37b, 37c and 37d extending along the optical axis are formed on the lens holder 11 for the correction lens L3 such that they are distanced from one another by 90 degrees formed on the outside of the lens holder. They are located such that the protrusion 37a is exactly in between spring brackets 32a and 32b, the protrusion 37b is exactly in between spring brackets 32b and 32c, the protrusion 37c is exactly in between the spring brackets 32c and 32d, and the protrusion 37d is exactly in between the spring brackets 32d and 32a. The protrusions 37a, 37b, 37c and 37d face the wire 34.

The wire 34 formed of shape memory alloy has a prescribed memorized shrunk form, and when the wire 34 is heated to a prescribed temperature, the wire 34 returns to the memorized shape.

In the construction described above, when no heat is applied to the wire 34 formed of shape memory alloy, the wire 34 is in contact with the ends of the coil springs 33a, 33b, 33c and 33d, and is pushed outward, as shown in FIG. 9. Consequently, the protrusions 37a, 37b, 37c and 37d formed on the outside of the fixed frame 11 and the wire 34 are not in contact with each other, such that the lens holder 11 is disengaged.

Where current is supplied to the wire 34 formed of shape memory alloy to heat the wire 34 up to the prescribed temperature so that the wire 34 engages with the lens holder 11, the wire 34 shrinks to the memorized shape against the spring force of the coil springs 33a, 33b, 33c and 33d. FIG. 10 shows this state. In this state, the wire 34 comes into contact with the protrusions 37a, 37b, 37c and 37d located outside the lens holder 11, whereupon the lens holder 11 is maintained in place by the wire 34.

In the construction described above, when the wire formed of shape memory alloy is heated and is returned to the memorized shape, the wire engages with and maintains in place the lens holder for the correction lens. However, it is also acceptable if the engagement with the lens holder for the correction lens is terminated when the wire formed of shape memory alloy is heated and returns to the memorized shape.

Because the control circuit that drives the correction lens drive mechanism and the correction lens engaging mechanism, as well as the drive control sequence, are the same as in the first embodiment explained above, and FIG. 7 also applies to this embodiment if the heater 19 connected to the heater driver 28 is replaced with the wire 34 formed of shape memory alloy, they will not be explained here.

Third Embodiment

The third embodiment will now be explained. The third embodiment also uses the same moving coil drive mechanism for the correction lens drive mechanism as that used in the first embodiment.

Figure 11:
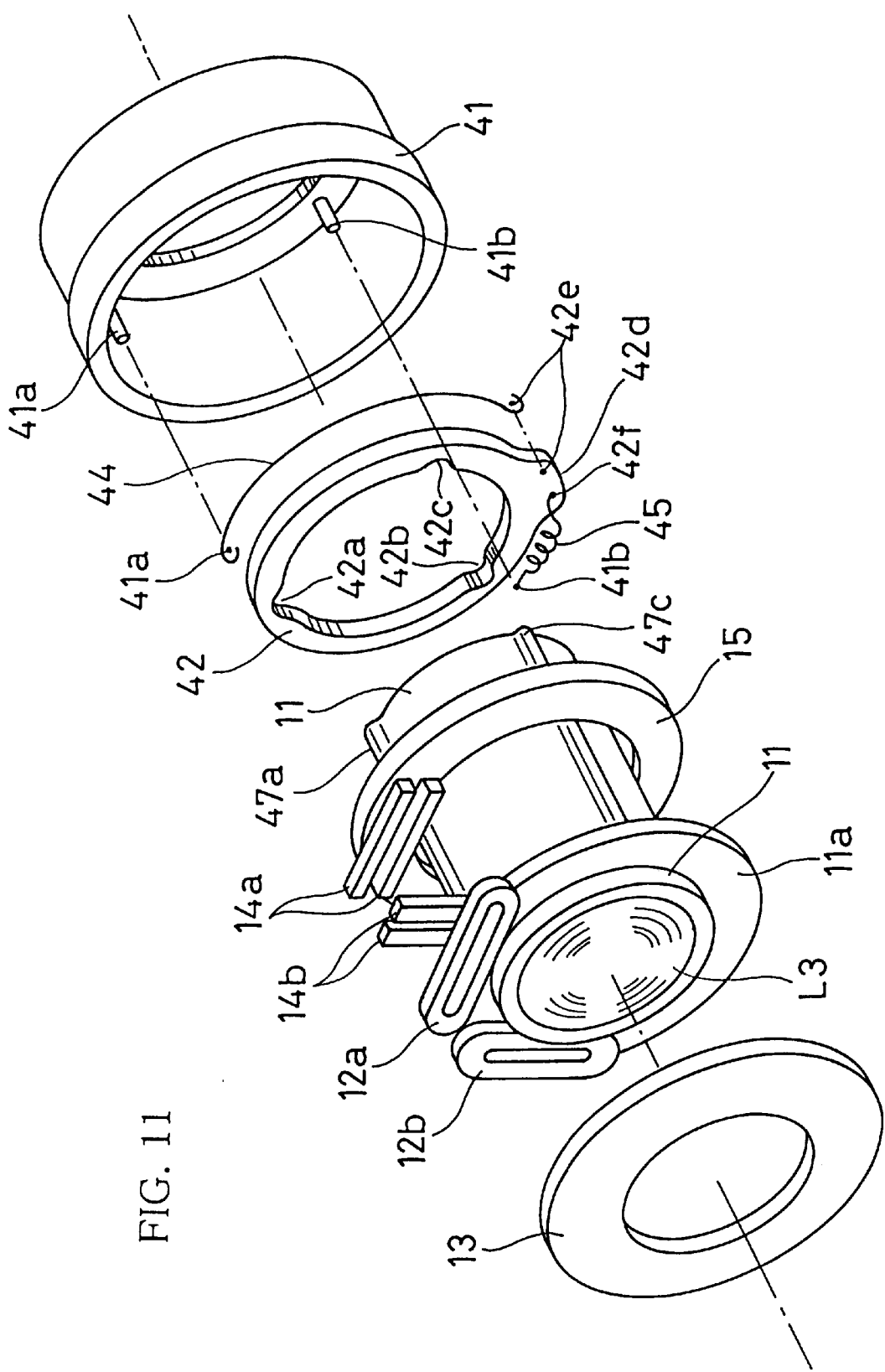
FIG. 11 is an exploded perspective view of the component elements of the correction lens drive mechanism and the correction lens engaging mechanism of the third embodiment.
Figure 12:
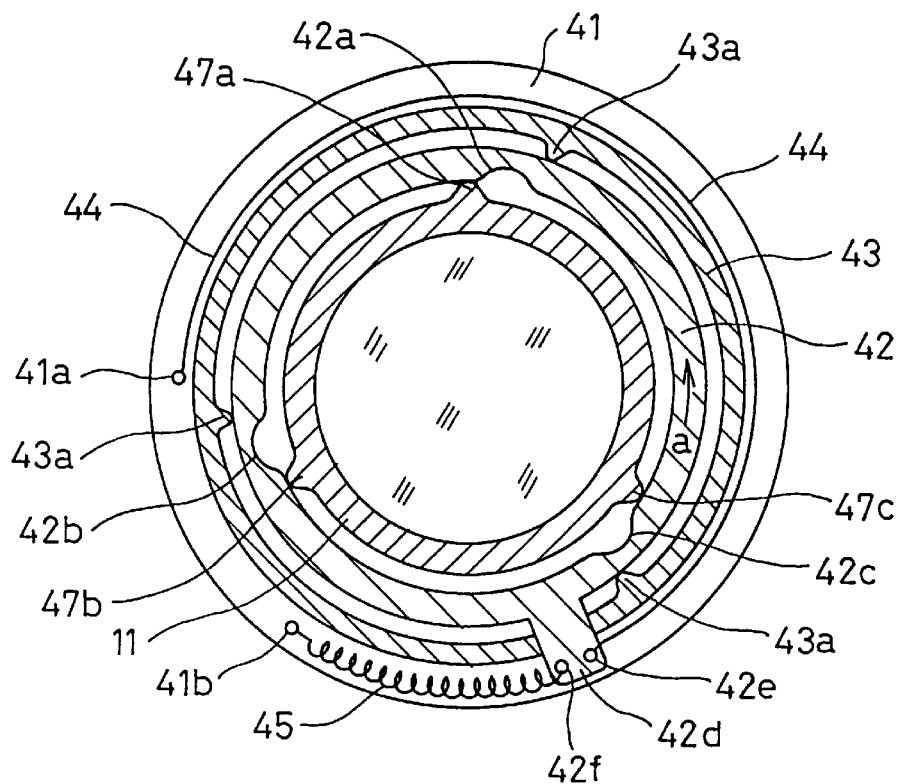
FIG. 12 is a cross-sectional view of the correction lens engaging mechanism of the third embodiment seen from the front.
Figure 13:
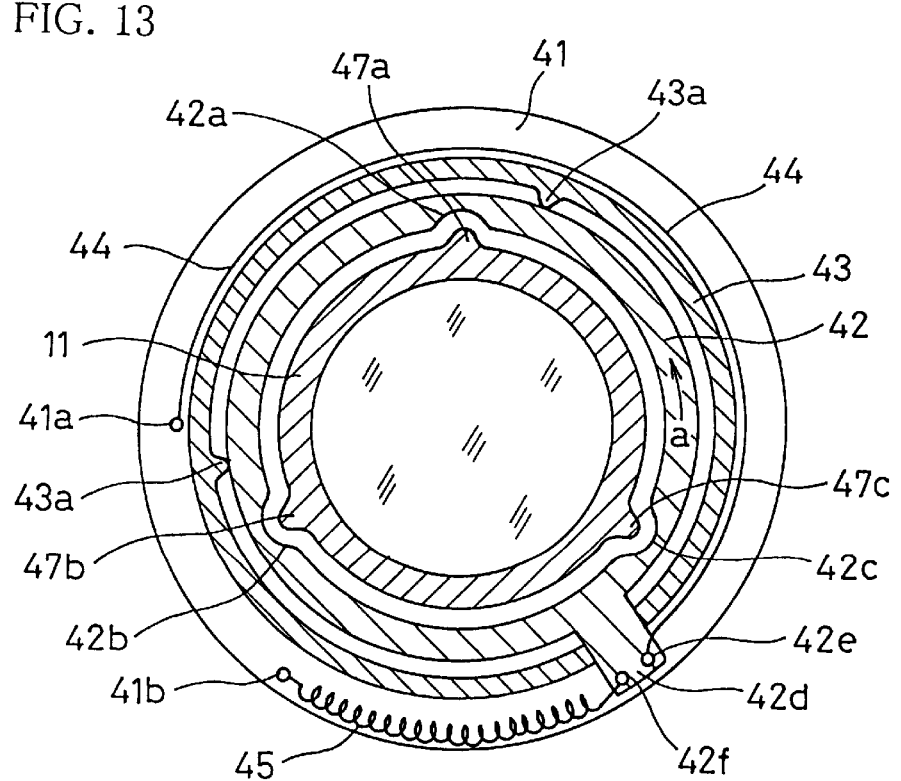
FIG. 13 is a cross-sectional view of the correction lens engaging mechanism of the third embodiment seen from the front.

FIG. 11 is an exploded perspective view of the component elements of the correction lens and its drive mechanism, and FIGS. 12 and 13 are cross-sectional views of the correction lens engaging mechanism when seen from the front. FIG. 12 shows the situation in which the correction lens is engaged while FIG. 13 shows the situation in which the correction lens is disengaged. The same numbers are used for the same members described in the first embodiment, and their detailed explanations are omitted.

In FIG. 11, coils 12a and 12b located parallel to the X axis and the Y axis, respectively, are mounted on the flange 11a of the lens holder 11 for the correction lens L3. When seen along the optical axis, a yoke 13 fixed to the fixed frame 18 is located in front of the coils 12a and 12b, and a yoke 15 fixed to the fixed frame 18 is located behind the coils 12a and 12b. Permanent magnets 14a and permanent magnets 14b are mounted to the yoke 15 such that the permanent magnets 14a face the coil 12a located parallel to the X axis and the permanent magnets 14b face the coil 12b located parallel to the Y axis.

The construction described above is the same as in the first embodiment and its operation does not differ from that of the first embodiment. In other words, when current is supplied to the coil 12a, the lens holder 11 for the correction lens L3 can be moved along the Y axis as a result of the force that is generated in the coil and works along the Y axis, while when current is supplied to the coil 12b, the lens holder 11 for the correction lens L3 can be moved along the X axis due to the force that is generated in the coil and works along the X axis.

The correction lens engaging mechanism will be explained with reference to FIGS. 12 and 13, as well as FIG. 11. A ring-shaped support member 43 is mounted on the ring-shaped fixed frame 41 inside the lens barrel, which is located outside the correction lens holder 11, and a ring-shaped engaging member 42 is located inside the ring of the support member 43 and is rotatably supported by the support member 43. Multiple protrusions 43a are formed on the inside of the ring of the support member 43 and supports the engaging member 42 by the protrusions 43a so as to be slightly rotates the engaging member 42. Pins 41a and 41b are located on the fixed frame 41. The ring-shaped support member 43 is omitted from the drawing in FIG. 11.

Three concave areas 42a, 42b and 42c are formed on the inside of the ring of the engaging member 42 such that they are distanced from one another by 120 degrees, and a protrusion 42d is formed on the outside of the ring. Pins 42e and 42f are located on the protrusion 42d.

A wire 44 formed of shape memory alloy is located outside the support member 43 on the fixed frame 41 to wrap around the support member 43. One end of the wire 44 is fixed to the pin 41a on the fixed frame 41 and the other end of the wire 44 is fixed to the pin 42e on the protrusion 42d of the engaging member 42.

Because the support member 43 on the fixed frame 41 is wrapped on its outside by the wire 44 formed of shape memory alloy, it is preferred that a holding structure in the form of a groove or other configurations be formed at least at the area at which the wire 44 is wrapped around, so that the wire may be prevented from detaching from the support member 43.

A coil spring 45 is suspended between the pin 42f on the protrusion 42d of the engaging member 42 and the pin 41b on the fixed frame 41, and pulls the engaging member 42 to rotate in a clockwise direction (the direction opposite from the arrow (a)).

On the other hand, protrusions 47a, 47b and 47c that extend along the optical axis and that are distanced from one another by 120 degrees are formed on the outside of the correction lens holder 11. They face the three concave areas 42a, 42b and 42c formed on the inside of the engaging member 42.

The wire 44 formed of shape memory alloy has a prescribed memorized shrunk shape. When the wire 44 is heated to a prescribed temperature, the wire 44 returns to the memorized shape.

In the construction described above, where no heat is applied to the wire 44 formed of shape memory alloy, the protrusions 47a, 47b and 47c of the correction lens holder 11 detach from the three concave areas 42a, 42b and 42c of the engaging member 42 because the engaging member 42 is being pulled by the coil spring 45 to rotate in the clockwise direction, as shown in FIG. 12, and the protrusions 47a, 47b and 47c come into pressure contact with the ring part (non-concave part). Consequently, the correction lens holder is maintained in place.

Where current is supplied to the wire 44 formed of shape memory alloy to heat the wire 44 to the prescribed temperature in order to terminate the engagement of the lens holder 11, the wire 44 shrinks to the memorized shape against the force of the coil spring 45 and rotates the engaging member 42 in a counterclockwise direction (the direction of the arrow (a)). When the engaging member 42 rotates in a counterclockwise direction, the protrusions 47a, 47b and 47c of the correction lens holder 11 come to the positions at which they face the three concave areas 42a, 42b and 42c of the engaging member 42, respectively. Consequently, the protrusions 47a, 47b and 47c are no longer in contact with the engaging member 42, whereupon the engagement of the correction lens holder is terminated. FIG. 13 shows this situation.

Because the control circuit that drives the correction lens drive mechanism and the correction lens engaging mechanism, as well as the drive control sequence, are the same as in the first embodiment explained above, and FIG. 7 also applies to this embodiment if the heater 19 connected to the heater driver 28 is replaced with the wire 44 formed of shape memory alloy, they will not be explained here.

In the construction described above, in order to maintain the state of disengagement, current must be supplied to the wire formed of shape memory alloy on a continuous basis. It is possible to maintain the state of disengagement, however, with intermittent current supply only by appropriately setting the heat capacity of the drive member by changing its diameter in order to adjust the time needed for the shape memory alloy to return to the memorized shape.

As another method to maintain the state of disengagement, it is possible to use a second engaging means that maintains the state of disengagement.

Fourth Embodiment

The fourth embodiment will be explained. The fourth embodiment is identical to the third embodiment except for that it includes a second engaging mechanism that maintains the state of disengagement.

Figure 14:
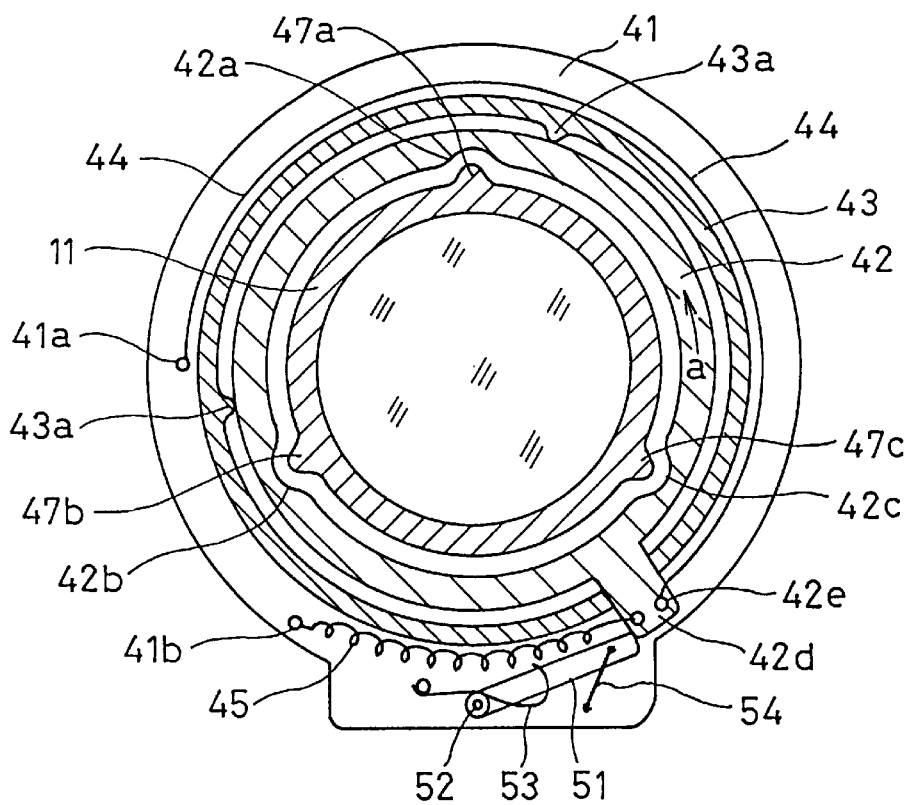
FIG. 14 is a cross-sectional view of the correction lens engaging mechanism of the fourth embodiment seen from the front.
Figure 15:
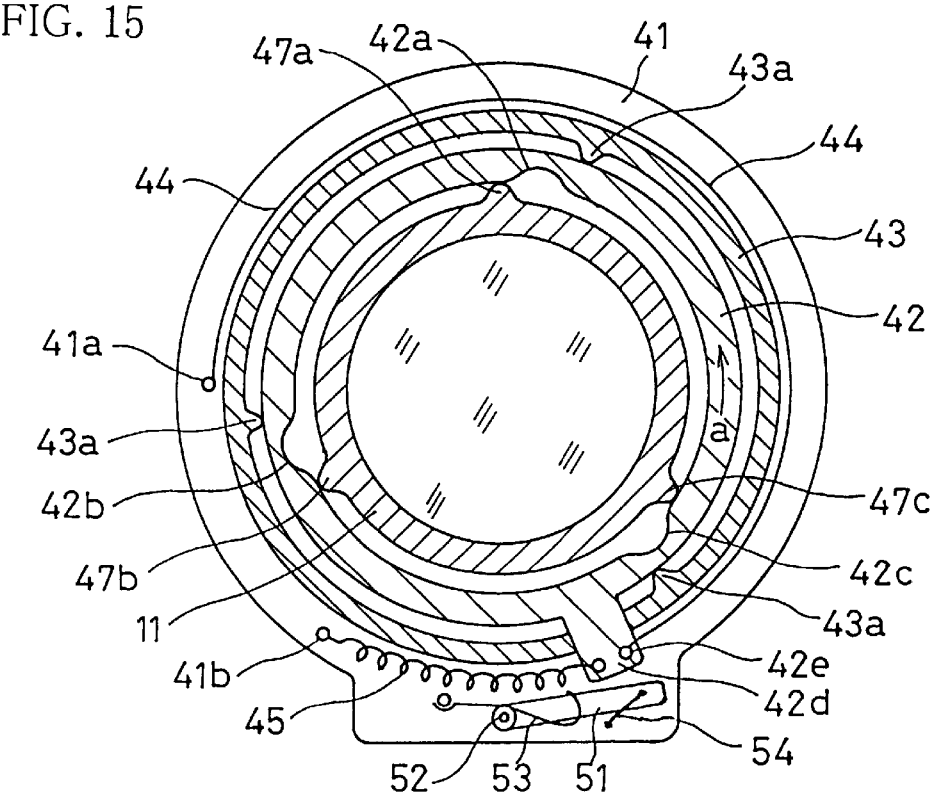
FIG. 15 is a cross-sectional view of the correction lens engaging mechanism of the fourth embodiment seen from the front.

FIGS. 14 and 15 are cross-sectional views of the correction lens engaging mechanism of the third embodiment, which is described above, seen from the front, and correspond to FIGS. 12 and 13. The same numbers are used for the same members as in FIGS. 12 and 13 and their detailed explanations are omitted. The second engaging mechanism only will be explained.

A second engaging member 51 that is rotatably supported around a shaft 52 is located on the fixed frame 41. An end of the shaft 52 is ordinarily forced by an elastic member 53, a spring for example, to engage with the protrusion 42d of the ring-shaped engaging member 42. A wire 54 formed of shape memory alloy that has a prescribed memorized shrunk shape is suspended between the second engaging member 51 and the fixed frame 41.

In the construction described above, where the engaging member 42 is disengaged from the correction lens holder 11, force is exerted on the second engaging member 51 by the elastic member 53. The second engaging member 51 rotates to the position at which it engages with the protrusion 42d of the engaging member 42 and maintains the engaging member 42 at that position. Consequently, even where the supply of current to the wire 44 formed of shape memory alloy is cut off, the engagement of the correction lens holder 11 by means of the engaging member 42 continues. FIG. 14 shows this state.

Where the engagement of the engaging member 42 by means of the second engaging member 51 is to be terminated, current is supplied to the wire 54 formed of shape memory alloy and the wire 54 is heated to a prescribed temperature. The wire 54 then returns to the memorized shape against the force of the elastic member 53 and causes the second engaging member 51 to disengage from the protrusion 42d of the engaging member 42, whereupon the engagement by the engaging member 42 is terminated. FIG. 15 shows this state.

At this position, as explained with reference to the third embodiment above, where no heat is applied to the wire 44 formed of shape memory alloy, the engaging member 42 is being pulled by the coil spring 45 to rotate in a clockwise direction, and therefore the protrusions 47a, 47b and 47c of the correction lens holder 11 detach from the three concave areas 42a, 42b and 42c of the engaging member 42 and come into pressure contact with the ring part (non-concave part), whereupon the correction lens holder is maintained in place.

In the explanations given above, a wire formed of shape memory alloy is used for the drive of the second engaging member 51, but a plunger or other type of actuator may be used instead. In addition, in the explanations given above, the engagement by the engaging member 42 is terminated when current is supplied to the wire 54 formed of shape memory alloy, but it is also acceptable that the engaging member 42 engages when current is supplied and that the engagement is terminated when the supply of current is cut off.

As explained with reference to the embodiments, by using an engaging mechanism formed of shape memory alloy for the correction lens engaging mechanism, the impact at the time of disengagement may be reduced and the inadvertent movement of the correction lens may be reduced. In addition, by performing the disengagement and the drive by means of the correction lens drive mechanism at the same time, the inadvertent movement of the correction lens may further be reduced.

Further, in the explanations given above, an example comprising a camera's lens apparatus in which the image shake correcting optical apparatus is incorporated was used, but needless to say, the image shake correcting optical apparatus may be applied in a lens apparatus used in devices other than cameras, such as a binocular.

Obviously, many modifications and variation of the present invention are possible in light of the above teachings. It is therefore to be understood within the scope of the appended claims, the invention may be practiced other than as specifically described.

What is claimed is:

1. An image shake correcting optical apparatus, comprising:

a correction optical system that is supported such that an optical axis of the correction optical system is moved relative to another optical system to decenter the correction optical system;

a drive mechanism that drives the correction optical system; and an engaging mechanism that has an action member of shape memory alloy and that has an engaging state in which the correction optical system is maintained at a position and a non-engaging state in which the correction optical system is not maintained at the position.

2. An image shake correcting optical apparatus as claimed in claim 1, wherein the optical axis of the correction optical system is, at the position, in substantial agreement with an axis of the another optical system.

3. An image shake correcting optical apparatus as claimed in claim 1, further comprising an elastic member having elastic force against return force of the action member of shape memory alloy.

4. An image shake correcting optical apparatus as claimed in claim 3, wherein the engaging mechanism is operated by the elastic force.

5. An image shake correcting optical apparatus as claimed in claim 4, further comprising a second engaging mechanism which maintains the engaging mechanism in the engaging state.

6. An image shake correcting optical apparatus as claimed in claim 5, wherein the second engaging mechanism includes an engaging mechanism of shape memory alloy.

7. An image shake correcting optical apparatus as claimed in claim 4, further comprising a second engaging mechanism which maintains the engaging mechanism in the non-engaging state.

8. An image shake correcting optical apparatus as claimed in claim 7, wherein the second engaging mechanism includes an engaging mechanism of shape memory alloy.

9. An image shake correcting optical apparatus, comprising:

a correction optical system that is supported such that an optical axis of the correction optical system is moved relative to another optical system to decenter the correction optical system;

a drive mechanism that drives the correction optical system;

an operation mechanism has an action member of shape memory alloy;

an engaging mechanism that has an engaging state in which the correction optical system is maintained at a position and a non-engaging state in which the correction optical system is not maintained at the position by the operation mechanism; and an elastic member biasing the action member in a direction so that the correction optical system is maintained at a position.

10. An image shake correcting optical apparatus as claimed in claim 9, wherein the optical axis of the correction optical system is, at the position, in substantial agreement with an axis of the another optical system.

11. An image shake correcting optical apparatus as claimed in claim 9, further comprising a second engaging mechanism which maintains the engaging mechanism in the engaging state.

12. An image shake correcting optical apparatus as claimed in claim 11, wherein the second engaging mechanism includes an engaging member of shape memory alloy.

13. An image shake correcting optical apparatus as claimed in claim 9, further comprising a second engaging mechanism which maintains the engaging mechanism in the non-engaging state.

14. An image shake correcting optical apparatus as claimed in claim 13, wherein the second engaging mechanism includes an engaging member of shape memory alloy.

15. An optical apparatus, comprising:

a main optical system;

a correction optical system that is supported such that an optical axis of the correction optical system is moved relative to the main optical system to decenter the correction optical system;

a drive mechanism that drives the correction optical system; and an engaging mechanism that has an action member of shape memory alloy and that has an engaging state in which the correction optical system is maintained at a position and a non-engaging state in which the correction optical system is not maintained at the position.

16. An optical apparatus as claimed in claim 15, wherein the optical axis of the correction optical system is, at the position, in substantial agreement with an axis of the main optical system.

* * * * *